(12) United States Patent
Ma et al.

(10) Patent No.: US 11,563,989 B2
(45) Date of Patent: Jan. 24, 2023

(54) SIGNAL PROCESSING DEVICE, AUDIO-VIDEO DISPLAY DEVICE AND PROCESSING METHOD

(71) Applicant: BOE TECHNOLOGY GROUP CO., LTD., Beijing (CN)

(72) Inventors: Xitong Ma, Beijing (CN); Lihua Geng, Beijing (CN); Congrui Wu, Beijing (CN); Yanfu Li, Beijing (CN); Xian Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 57 days.

(21) Appl. No.: 17/331,209

(22) Filed: May 26, 2021

(65) Prior Publication Data

US 2022/0060764 A1 Feb. 24, 2022

(30) Foreign Application Priority Data

Aug. 18, 2020 (CN) .......................... 202010831032.1

(51) Int. Cl.

| H04N 21/2365 | (2011.01) |
|---|---|
| G06F 13/40 | (2006.01) |
| G11B 27/32 | (2006.01) |
| H04N 21/23 | (2011.01) |
| H04N 21/2368 | (2011.01) |
| H04N 21/236 | (2011.01) |

(52) U.S. Cl.
CPC ..... *H04N 21/2365* (2013.01); *G06F 13/4031* (2013.01); *G11B 27/323* (2013.01); *H04N 21/2368* (2013.01); *H04N 21/23602* (2013.01)

(58) Field of Classification Search
CPC ......... H04N 21/2365; H04N 21/23602; H04N 21/2368; G06F 13/40; G11B 27/323
USPC ........................................................ 375/240.1
See application file for complete search history.

(56) References Cited

U.S. PATENT DOCUMENTS

2003/0133426 A1* 7/2003 Schein ................ H04W 74/006
370/347

\* cited by examiner

*Primary Examiner* — Jeffery A Williams
(74) *Attorney, Agent, or Firm* — Myers Bigel, P.A.

(57) ABSTRACT

A signal processing device is disclosed, which includes a plurality of channel receivers, a plurality of time code processors in one-to-one correspondence with the channel receivers, a timing generator, a signal processor and a transmitter, wherein each channel receiver is configured to parse an audio-video signal which has a data format defined by the SDI protocol and including a time code that characterizes time information. Each time code processor is configured to extract the time code from a parsed audio-video signal obtained by a corresponding channel receiver, and form first frame image data including a frame time code. The signal processor is configured to form an absolute frame output image based on multiple channels of the first frame of image data, frame time codes therein, and an internal clock signal generated by the timing generator. The transmitter is configured to transmit the absolute frame output image for display.

17 Claims, 3 Drawing Sheets

SIGNAL PROCESSING DEVICE, AUDIO-VIDEO DISPLAY DEVICE AND PROCESSING METHOD

RELATED APPLICATION

The present application claims the benefit of Chinese Patent Application CN202010831032.1 filed on Aug. 18, 2020, the entire disclosure of which is incorporated herein by reference.

FIELD

The present disclosure relates to the field of display technology, particularly to a signal processing device, an audio-video display device and a processing method.

BACKGROUND

At present, signal processing devices applied to transmission of audio-video signals usually employ four 12G-SDI (serial digital interface) wires to transmit 8K ultra-high-definition audio-video signals, or four 3G-SDI wires to transmit 4K ultra-high-definition audio-video signals, so that the signal transmission rate is very fast. However, during the actual use process, due to different qualities or lengths of the wires, delays of signals reaching an external display terminal may be different. Therefore, an FPGA (Field Programmable Gate Array) or SOC (System-on-a-Chip, system on chip) needs to be used to perform synchronization of input video signals.

Currently, an adjacent frame synchronization mechanism is mostly used in synchronization processing. The situation where there is excessive signal delay between lines may result in misaligned and spliced display.

SUMMARY

The present disclosure provides a signal processing device, an audio-video display device, and a processing method of the signal processing device so as to solve some or all of the above-mentioned problems and other possible problems.

According to a first aspect of the present disclosure, there is provided a signal processing device applied to an audio-video signal, comprising: a plurality of channel receivers, a plurality of time code processors in one-to-one correspondence with the plurality of channel receivers, a timing generator, a signal processor, and a transmitter, wherein each of the plurality of channel receivers is configured to parse an audio-video signal received, wherein the audio-video signal has a data format defined by an SDI protocol and the data format comprises a time code that characterizes time information;

each of the plurality of time code processors is configured to extract the time code from a parsed audio-video signal obtained by a corresponding channel receiver through parsing and convert it into a frame time code that characterizes frame timing information, and form a first frame image data comprising the frame time code and transmit it to the signal processor;

the signal processor is configured to form an absolute frame output image based on multiple channels of the first frame image data, frame time codes in multiple channels of the first frame image data, and an internal clock signal generated by the timing generator;

the transmitter is configured to transmit the absolute frame output image for display.

Optionally, the signal processor is further configured to communicate with an external storage corresponding to the signal processing device, transmit multiple channels of the first frame image data to the external storage, respectively, and form an absolute frame output image according to multiple channels of second frame image data read from the external storage and the internal clock signal generated by the timing generator, wherein the multiple channels of second frame image data are image data belonging to a same absolute frame and formed by synchronizing the multiple channels of the first frame image data using the frame time code in an absolute frame synchronization manner.

Optionally, the time code comprises hour data, minute data, second data, and frame data, wherein each of the plurality of time code processors is further configured to convert the frame data of the time code into a frame time code that characterizes frame timing information.

Optionally, the frame data comprises high-order frame data and low-order frame data, wherein each of the plurality of time code processors is further configured to convert the low-order frame data of the frame data into a frame time code that characterizes frame timing information.

Optionally, the signal processor comprises a bus arbiter, a pixel rearrangement processor, a plurality of input storages in one-to-one correspondence with the plurality of time code processors, and a plurality of output storages in one-to-one correspondence with the plurality of time code processors, wherein each of the plurality of input storages is configured to transmit a first frame image data from a corresponding time code processor to the bus arbiter;

the bus arbiter is configured to communicate with an external storage corresponding to the signal processing device, transmit multiple channels of the first frame image data to the external storage, and send multiple channels of second frame image data read from the external storage to corresponding output storages;

each of the plurality of output storages is configured to form third frame image data according to the internal clock signal and received second frame image data, and transmit the third frame image data to the pixel rearrangement processor;

the pixel rearrangement processor is configured to perform pixel rearrangement on multiple channels of the third frame image data and form an absolute frame output image.

Optionally, the transmitter comprises a V-By-One communication interface configured to transmit the absolute frame output image to an external display terminal.

According to a second aspect of the present disclosure, there is provided an audio-video display device, comprising the signal processing device according to the first aspect of the present disclosure.

According to a third aspect of the present disclosure, there is provided a processing method using the signal processing device according to the first aspect of the present disclosure, comprising:

using each of the plurality of channel receivers to parse an audio-video signal received, wherein the audio-video signal has a data format defined by an SDI protocol and the data format comprises a time code that characterizes time information;

using the time code processor to extract the time code from a parsed audio-video signal obtained by a corresponding channel receiver through parsing and convert the time code into a frame time code that characterizes frame timing information, and form first frame image data comprising the frame time code and transmit it to the signal processor;

using the signal processor to form an absolute frame output image based on multiple channels of the first frame image data, frame time codes in multiple channels of the first frame image data, and an internal clock signal generated by the timing generator;

using the transmitter to transmit the absolute frame output image for display.

Optionally, said using the signal processor to form an absolute frame output image based on multiple channels of the first frame image data, frame time codes in multiple channels of the first frame image data, and an internal clock signal generated by the timing generator comprises:

using the signal processor to transmit multiple channels of the first frame image data received to an external storage corresponding to the signal processing device, respectively and form an absolute frame output image according to multiple channels of second frame image data read from the external storage and the internal clock signal, wherein the multiple channels of second frame image data are image data belonging to a same absolute frame and formed by synchronizing the multiple channels of the first frame image data using the frame time code in an absolute frame synchronization manner.

Optionally, the time code comprises hour data, minute data, second data, and frame data, and wherein said using the time code processor to convert the time code into a frame time code that characterizes frame timing information further comprises:

using the time code processor to form a frame time code that characterizes frame timing information according to the frame data of the time code.

Optionally, the frame data comprises high-order frame data and low-order frame data, and wherein said using the time code processor to form a frame time code that characterizes frame timing information according to the frame data of the time code further comprises:

using the time code processor to form a frame time code that characterizes frame timing information according to the low-order frame data of the frame data.

Optionally, the signal processor comprises a bus arbiter, a pixel rearrangement processor, a plurality of input storages in one-to-one correspondence with the plurality of time code processors, and a plurality of output storages in one-to-one correspondence with the plurality of time code processors, wherein said using the signal processor to transmit multiple channels of the first frame image data received to an external storage corresponding to the signal processing device, respectively and form an absolute frame output image according to the multiple channels of second frame image data read from the external storage and the internal clock signal further comprises:

using each of the plurality of input storages to transmit the first frame image data from a corresponding time code processor to the bus arbiter;

using the bus arbiter to communicate with the external storage corresponding to the signal processing device, transmit the multiple channels of the first frame image data to the external storage, and send the multiple channels of second frame image data read from the external storage to corresponding output storages;

using the output storages to form third frame image data according to the internal clock signal and the second frame image data, and transmit the third frame image data to the pixel rearrangement processor;

using the pixel rearrangement processor to perform pixel rearrangement on multiple channels of the third frame image data and form an absolute frame output image.

BRIEF DESCRIPTION OF THE DRAWINGS

In order to more clearly illustrate the technical solutions in embodiments of the present disclosure, the drawings to be used for description of the embodiments will be briefly introduced below. Obviously, the drawings described below are only some embodiments of the present disclosure. A person having an ordinary skill in the art may also obtain other drawings based on these drawings without spending inventive efforts.

DETAILED DESCRIPTION

Figure 1:
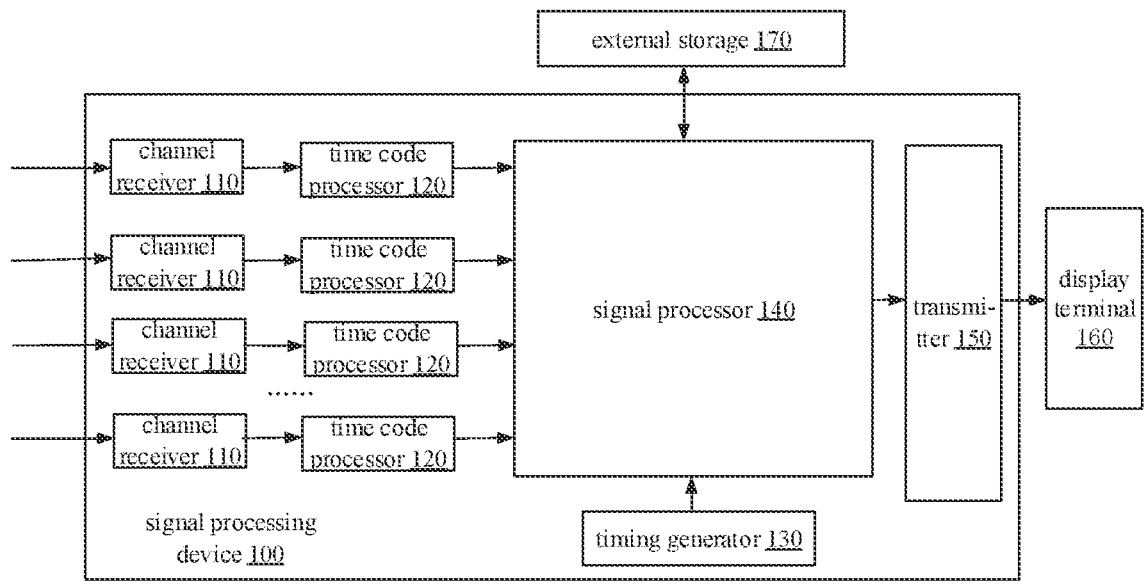
FIG. 1 illustrates a structural block diagram of a signal processing device according to an embodiment of the present disclosure.

In order to set forth the present disclosure more clearly, the present disclosure will be further described below in conjunction with optional embodiments and the drawings. Similar components in the drawings are denoted by the same reference numerals. Those skilled in the art should understand that contents specifically described below are illustrative rather than restrictive, and should not be used to limit the protection scope of the present disclosure.

As shown in FIG. 1, an embodiment of the present disclosure provides a signal processing device 100 applied to an audio-video signal. The signal processing device 100 comprises a plurality of channel receivers 110, a plurality of time code processors 120 in one-to-one correspondence with the plurality of channel receivers 110, a timing generator 130, a signal processor 140, and a transmitter 150. Each of the plurality of channel receivers 110 is configured to parse an audio-video signal received, for example, from an external signal source, wherein the audio-video signal has a data format defined by the SDI protocol and the data format includes a time code characterizing time information. Each of the plurality of time code processors 120 is configured to extract the time code from the parsed audio-video signal obtained by a corresponding channel receiver through parsing and convert it into a frame time code characterizing frame timing information, and form first frame image data including the frame time code and transmit it to the signal processor. The signal processor 140 is configured to form an absolute frame output image based on multiple channels of the first frame image data, frame time codes in multiple channels of the first frame image data and an internal clock signal generated by the timing generator 130. The transmitter 150 is configured to transmit the absolute frame output image (for example, to an external display terminal 160) for display. It is to be noted that the time information characterized by the time code includes channel time information of a corresponding channel (also referred to as clock information the channel).

In some embodiments, the signal processor is configured to communicate with an external storage 170 corresponding to the signal processing device, transmit received multiple channels of the first frame image data to the external storage, respectively, and form an absolute frame output image according to multiple channels of second frame image data read from the external storage and the internal clock signal generated by the timing generator, wherein the multiple channels of second frame image data are image data belonging to the same absolute frame and formed by synchronizing the multiple channels of the first frame image data using the frame time code in an absolute frame synchronization manner.

In this embodiment, the time code of the audio-video signal using the SDI protocol is utilized to synchronize the audio-video signals transmitted by channels in the multiple channels (corresponding to the channel receivers), thereby forming a synchronization mechanism that performs synchronization with an absolute frame. This can avoid the display problem of misaligned frame splicing caused by excessive delay between frames during data transmission due to line problems, and effectively enhance the synchronous transmission performance of the audio-video signals, which can improve the user experience and has a wide application prospect.

Specifically, when external audio-video signals are input into the signal processing device through multiple channels, each channel receiver of the signal processing device receives the audio-video signals from the external signal source, and the audio-video signal includes a time code of the timing information (i.e., the time information described above) from the external signal source. Each channel receiver receives its audio-video signal in a serial manner, and transmits the serially input audio-video signal to a corresponding time code processor after converting it into a parallel signal and performing signal processing.

The time code processor further parses the audio-video signal according to the data format defined by the SDI protocol, and parses out 58-bit binary bit information. Time code formats of the SDI protocol are shown in Table 1. The time code formats in the SDI protocol are time information including hour data, minute data, second data, and frame data.

TABLE 1

Time code formats of the SDI protocol

| Bits | Definition |
| --- | --- |
| 0-3 | low-order frame data |
| 8-9 | high-order frame data |
| 16-19 | low-order second data |
| 24-26 | high-order second data |
| 32-35 | low-order minute data |
| 40-42 | high-order minute data |
| 48-51 | low-order hour data |
| 56-57 | high-order hour data |

In an optional embodiment, in consideration of the time range of the signal delay resulting from the signal line transmission, the time code processor may perform synchronization only using the frame data in the time code format. That is, the frame data of the time code is converted into a frame time code that characterizes frame timing information. For example, the low-order frame data and the high-order frame data are spliced to form a frame time code using an 8-bit binary number, and then the same frame data identified by the frame time code is used to perform absolute frame synchronization, which can avoid the display problem of misaligned frame splicing caused by excessive delay between frames during data transmission due to line problems, effectively enhance the synchronous transmission performance of the audio-video signals, and improve the user experience.

In another optional embodiment, considering that the capacity of the corresponding external storage is limited, the time code processor of this embodiment may perform synchronization only using the low-order frame data of the time code. That is, the low-order frame data of the time code is converted into a frame time code that characterizes frame timing information. For example, the low-order frame data with a 4-bit binary number is used to form a frame time code, and the same frame data identified by the frame time code is used to perform absolute frame synchronization.

The time code processor forms the received audio-video signal into first frame image data including the frame time code, and transmits it to the signal processor for absolute frame synchronization. Optionally, the signal processor may communicate with an external storage corresponding to the signal processing device, transmit multiple channels of first frame image data including frame time codes to the external storage, and form an absolute frame output image based on multiple channels of second frame image data read from the external storage and the internal clock signal generated by the timing generator and transmit it to the transmitter. The absolute frame output image is sent to an external display terminal by the transmitter.

In other words, in the present disclosure, the time code of the SDI protocol is used to form a frame signal (i.e., frame time code) for absolute frame synchronization, the frame signal is used to perform absolute frame synchronization on input multiple channels of audio-video signals, and then the clock signal of a local clock (i.e., timing generator) is used to control the output of the signal processing device, thereby realizing synchronization and signal processing of the input multiple channels of audio-video signals to form an absolute frame output image that can be played by an external display terminal.

Figure 2:
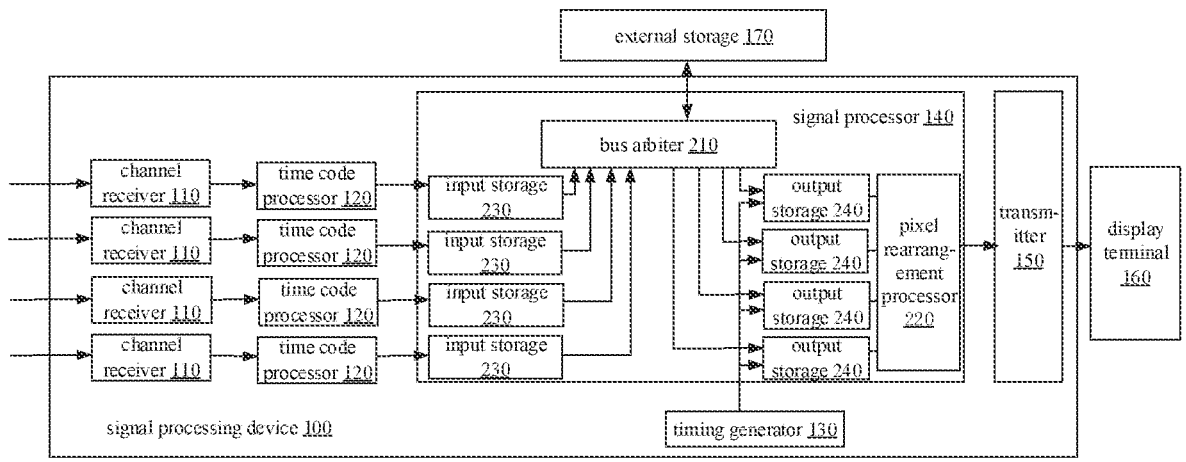
FIG. 2 illustrates a structural block diagram of a signal processing device according to another embodiment of the present disclosure.

As shown in FIG. 2, in an optional embodiment, the signal processor 140 comprises a bus arbiter 210, a pixel rearrangement processor 220, a plurality of input storages 230 and a plurality of output storages 240 in one-to-one correspondence with the plurality of time code processors 120, wherein each of the plurality of input storages 230 is configured to transmit the first frame image data from a corresponding time code processor to the bus arbiter. The bus arbiter 210 is configured to communicate with an external storage corresponding to the signal processing device, transmit multiple channels of the first frame image data to the external storage, and send multiple channels of second frame image data read from the external storage to corresponding output storages. Each of the plurality of output storages 240 is configured to form third frame image data according to the internal clock signal and the received second frame image data, and transmit the third frame image data to the pixel rearrangement processor. The pixel rearrangement processor 220 is configured to perform pixel rearrangement on multiple channels of the third frame image data and form the absolute frame output image.

Specifically, the first frame image data output by each time code processor is transmitted to a corresponding input storage at the rising edge of its vertical synchronization signal (VSYNC), and the corresponding input storage transmits it to the bus arbiter. The bus arbiter transmits the first frame image data of each channel to the external storage according to the bus arbitration sequence. In other words, the first frame image data is transmitted to the external storage based on the clock signal of a corresponding channel.

The bus arbiter reads out multiple channels of second frame image data from the external storage. The multiple channels of second frame image data are image data belonging to the same absolute frame and formed by synchronizing the multiple channels of first frame image data using the frame time code in an absolute frame synchronization manner. The multiple channels of second frame image data are then transmitted to corresponding output storages, respectively.

In order to unify the clocks for outputting image data, in each output storage, a third frame image with local clock information is formed using the internal clock signal generated by the timing generator of the signal processing device and the corresponding second frame image data, and transmitted to the pixel rearrangement processor.

The pixel rearrangement processor performs pixel rearrangement according to the received multiple channels of third frame image data to form a frame of image and outputs it to the transmitter, and the transmitter transmits the formed frame of image to an external display terminal for presentation, thereby realizing synchronization and transmission of multiple channels of audio-video signals.

Specifically, the transmitter of this embodiment may comprise a VBO (V By One, a digital interface standard dedicated to image transmission) communication interface, which is configured to transmit the absolute frame output image to an external display terminal. That is, the transmitter and the external display terminal establish a communicative connection through the VBO communication interface, and transmit data signals.

In the foregoing embodiment, absolute frame synchronization is performed on the audio-video signals received by a plurality of channels receivers through the time code in the SDI protocol formats, which avoids the display problem of misaligned frame splicing caused by excessive delay between frames during data transmission due to line problems, effectively enhances the synchronous transmission performance of the audio-video signals, and improves the user experience.

It is to be noted that in the embodiments of the present disclosure, any one of the time code processor, the signal processor, the bus arbiter, and the pixel rearrangement processor may be implemented as a processor and microprocessor including hardware (for example, one or more processing cores), and a device or circuit with a data processing capability such as a programmable logic device, for example, a time code processing circuit, a signal processing circuit, a bus arbitration circuit, and a pixel rearrangement circuit. The timing generator may be, for example, any clock circuit capable of generating timing or a clock, such as a common quartz crystal oscillator. Any one of the external storage, the input storage, and the output storage described herein includes both a volatile memory and a non-volatile memory (for example, RAM, ROM, etc.).

An embodiment of the present application further provides a processing method using the signal processing device described above. Since the processing method provided by this embodiment of the present application corresponds to the signal processing device provided by the several embodiments described above, the technical means and effects in the foregoing embodiments are also applicable to the processing method provided by this embodiment, and will not be described in detail in this embodiment.

Figure 3:
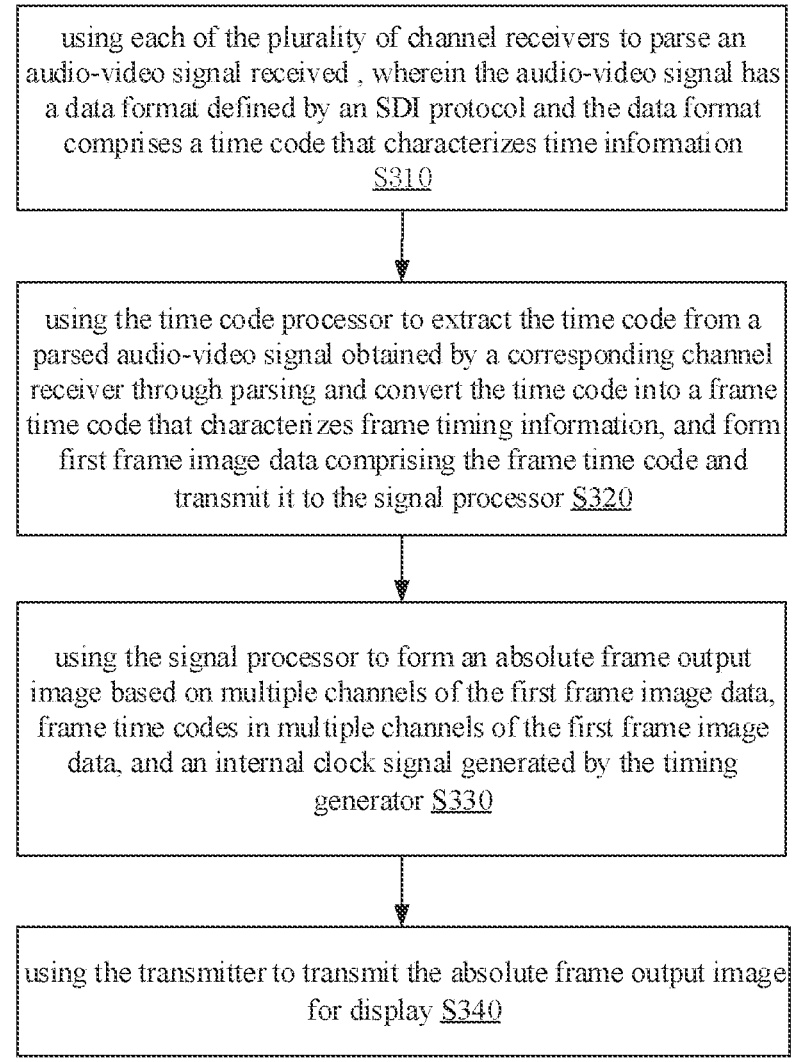
FIG. 3 illustrates a flow chart of a processing method performed using a signal processing device according to an embodiment of the present disclosure.

As shown in FIG. 3, an embodiment of the present application further provides a processing method using the signal processing device described above, comprising: using each of the plurality of channel receivers to parse an audio-video signal received, for example, from an external signal source, wherein the audio-video signal has a data format defined by the SDI protocol and the data format includes a time code characterizing time information (S310); using the time code processor to extract a time code from a parsed audio-video signal obtained by a corresponding channel receiver through parsing and convert the time code into a frame time code characterizing frame timing information, and form first frame image data including the frame time code and transmit it to the signal processor (S320); using the signal processor to form an absolute frame output image based on multiple channels of first frame image data, frame time codes in the multiple channels of first frame image data, and an internal clock signal generated by the timing generator (S330); using the transmitter to transmit the absolute frame output image (for example, to an external display terminal) for display (S340). It is to be noted that the time information characterized by the time code includes the clock information of a corresponding channel.

In some embodiments, at the time of using the signal processor to form an absolute frame output image based on multiple channels of first frame image data, frame time codes in the multiple channels of first frame image data, and an internal clock signal generated by the timing generator, the signal processor may be used to transmit the received multiple channels of first frame image data to an external storage corresponding to the signal processing device, respectively, and form an absolute frame output image according to multiple channels of second frame image data read from the external storage and the internal clock signal, wherein the multiple channels of second frame image data are image data belonging to the same absolute frame and formed by synchronizing the multiple channels of first frame image data using the frame time code in an absolute frame synchronization manner.

In this embodiment, the time code of the audio-video signal using the SDI protocol is utilized to synchronize the audio-video signals transmitted by channels in the multiple channels (corresponding to the channel receivers), thereby forming a synchronization mechanism that performs synchronization with an absolute frame. This can avoid the display problem of misaligned frame splicing caused by excessive delay between frames during data transmission due to line problems, and effectively enhance the synchronous transmission performance of the audio-video signals, which can improve the user experience and has a wide application prospect. This embodiment is implemented in the same way as the foregoing embodiments, which will not be repeated here.

In an optional embodiment, the time code includes hour data, minute data, second data, and frame data. Using the time code processor to convert the time code into a frame time code that characterizes frame timing information further comprises: using the time code processor to form a frame time code that characterizes frame timing information according to the frame data of the time code.

In this embodiment, the low-order frame data and the high-order frame data in the time code can be spliced using a 8-bit binary number to form a frame time code, and then the same frame data identified by the frame time code is used to perform absolute frame synchronization, which avoids the display problem of misaligned frame splicing caused by excessive delay between frames during data transmission due to line problems, effectively enhances the synchronous transmission performance of the audio-video signals, and improves the user experience.

Therefore, in an optional embodiment, the frame data includes high-order frame data and low-order frame data. Using the time code processor to form a frame time code that characterizes frame timing information according to the frame data of the time code further comprises: using the time code processor to form a frame time code that characterizes frame timing information according to the low-order frame data of the frame data.

In this embodiment, considering that the capacity of the corresponding external storage is limited, the low-order frame data with a 4-bit binary number can be used to form a frame time code, and then the same frame data identified by the frame time code can be used to perform absolute frame synchronization, which effectively enhances the synchronous transmission performance of the audio-video signals and improves the user experience.

In an optional embodiment, the signal processor comprises a bus arbiter, a pixel rearrangement processor, and a plurality of input storages and output storages in one-to-one correspondence with the plurality of time code processors, respectively. Said using the signal processor to transmit the received multiple channels of first frame image data to an external storage corresponding to the signal processing device, respectively and form an absolute frame output image according to multiple channels of second frame image data read from the external storage and the internal clock signal further comprises: using each of the plurality of input storages to transmit the first frame image data from a corresponding time code processor to the bus arbiter; using the bus arbiter to communicate with the external storage corresponding to the signal processing device, transmit the multiple channels of first frame image data to the external storage, and send multiple channels of second frame image data read from the external storage to corresponding output storages; using the output storages to form third frame image data according to the internal clock signal and the second frame image data and transmitting the third frame image data to the pixel rearrangement processor; using the pixel arrangement processor to perform pixel rearrangement on multiple channels of third frame image data and form an absolute frame output image.

In this embodiment, absolute frame synchronization and signal processing are performed on multiple channels of audio-video signals by means of the input storage, the bus arbiter, the output storage, and the pixel rearrangement processor, thereby forming a frame of audio-video data that can be played by an external display terminal. This effectively enhances the synchronous transmission performance of audio-video signals, and improves the user experience.

Figure 4:
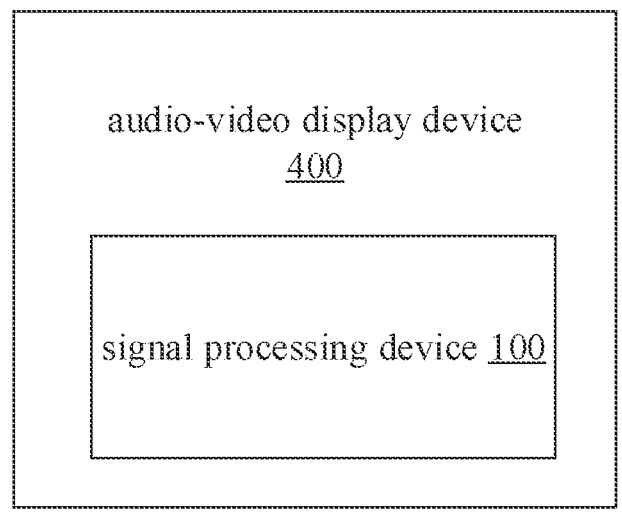
FIG. 4 illustrates a structural block diagram of an audio-video display device according to an embodiment of the present disclosure.

Based on the signal processing device described above, an embodiment of the present disclosure provides an audio-video display device 400. As shown in FIG. 4, the audio-video display device 400 comprises the signal processing device 100 described above.

In this embodiment, the audio-video display device may include any product or component with a display function, such as a mobile phone, a tablet computer, a television, a monitor, a notebook computer, a digital photo frame, or a navigator.

As described above, the present disclosure provides a signal processing device, an audio-video display device, and a processing method of the signal processing device. By converting the time code in the audio-video signal using the SDI protocol into a frame time code that characterizes frame timing information, and forming an absolute frame output image of absolute frame synchronization using the frame time code, the first frame image data including the frame time code and the internal clock signal, the situation of misaligned and spliced display is avoided, which effectively enhances the synchronous transmission performance of audio-video signals, improves the user experience, and has a wide application prospect.

Obviously, the foregoing embodiments of the present disclosure are merely examples to clearly illustrate the present disclosure, and are not intended to limit the implementation of the present disclosure. For a person having an ordinary skill in the art, other variations or changes in different forms may be further made on the basis of the foregoing description. Therefore, all obvious variations or changes derived from the technical solutions of the present disclosure are still within the protection scope of the present disclosure.

The invention claimed is:

1. A signal processing device applied to an audio-video signal, comprising:
    a plurality of channel receivers;
    a plurality of time code processors in one-to-one correspondence with the plurality of channel receivers;
    a timing generator;
    a signal processor; and
    a transmitter,
    wherein each of the plurality of channel receivers is configured to parse an audio-video signal received, wherein the audio-video signal has a data format defined by an SDI protocol and the data format comprises a time code that characterizes time information,
    wherein each of the plurality of time code processors is configured to extract the time code from a parsed audio-video signal obtained by a corresponding channel receiver through parsing and convert the time code into a frame time code that characterizes frame timing information, and form a first frame image data comprising the frame time code and transmit the first frame image data to the signal processor,
    wherein the signal processor is configured to form an absolute frame output image based on multiple channels of the first frame image data, frame time codes in multiple channels of the first frame image data, and an internal clock signal generated by the timing generator, and
    wherein the transmitter is configured to transmit the absolute frame output image for display.

2. The signal processing device according to claim 1, wherein the signal processor is further configured to communicate with an external storage corresponding to the signal processing device, transmit the multiple channels of the first frame image data to the external storage, respectively, and form an absolute frame output image according to multiple channels of second frame image data read from the external storage and the internal clock signal generated by the timing generator, and
    wherein the multiple channels of second frame image data are image data belonging to a same absolute frame and are formed by synchronizing the multiple channels of the first frame image data using the frame time code in an absolute frame synchronization manner.

3. The signal processing device according to claim 1, wherein the time code comprises hour data, minute data, second data, and frame data, and wherein each of the plurality of time code processors is further configured to convert the frame data of the time code into a frame time code that characterizes frame timing information.

4. The signal processing device according to claim 3, wherein the frame data comprises high-order frame data and low-order frame data, and
wherein each of the plurality of time code processors is further configured to convert the low-order frame data of the frame data into a frame time code that characterizes frame timing information.

5. The signal processing device according to claim 2, wherein the signal processor comprises a bus arbiter, a pixel rearrangement processor, a plurality of input storages in one-to-one correspondence with the plurality of time code processors, and a plurality of output storages in one-to-one correspondence with the plurality of time code processors,
wherein each of the plurality of input storages is configured to transmit a first frame image data from a corresponding time code processor to the bus arbiter,
wherein the bus arbiter is configured to communicate with an external storage corresponding to the signal processing device, transmit multiple channels of the first frame image data to the external storage, and send multiple channels of second frame image data read from the external storage to corresponding output storages,
wherein each of the plurality of output storages is configured to form third frame image data according to the internal clock signal and received second frame image data and transmit the third frame image data to the pixel rearrangement processor, and
wherein the pixel rearrangement processor is configured to perform pixel rearrangement on multiple channels of the third frame image data and form an absolute frame output image.

6. The signal processing device according to claim 1, wherein the transmitter comprises a V-By-One communication interface configured to transmit the absolute frame output image to an external display terminal.

7. An audio-video display device, comprising the signal processing device according to claim 1.

8. The audio-video display device according to claim 7, wherein the signal processor is configured to communicate with an external storage corresponding to the signal processing device, transmit the multiple channels of the first frame image data to the external storage, respectively, and form an absolute frame output image according to multiple channels of second frame image data read from the external storage and an internal clock signal generated by the timing generator, and
wherein the multiple channels of second frame image data are image data belonging to a same absolute frame and formed by synchronizing the multiple channels of the first frame image data using the frame time code in an absolute frame synchronization manner.

9. The audio-video display device according to claim 7, wherein the time code comprises hour data, minute data, second data, and frame data, and
wherein each of the plurality of time code processors is further configured to convert the frame data of the time code into a frame time code that characterizes frame timing information.

10. The audio-video display device according to claim 9, wherein the frame data comprises high-order frame data and low-order frame data, and
wherein each of the plurality of time code processors is further configured to convert the low-order frame data into a frame time code that characterizes frame timing information.

11. The audio-video display device according to claim 8, wherein the signal processor comprises a bus arbiter, a pixel rearrangement processor, a plurality of input storages in one-to-one correspondence with the plurality of time code processors, and a plurality of output storages in one-to-one correspondence with the plurality of time code processors,
wherein each of the plurality of input storages is configured to transmit the first frame image data from a corresponding time code processor to the bus arbiter,
wherein the bus arbiter is configured to communicate with an external storage corresponding to the signal processing device, transmit the multiple channels of the first frame image data to the external storage, and send the multiple channels of second frame image data read from the external storage to corresponding output storages,
wherein each of the plurality of output storages is configured to form third frame image data according to the internal clock signal and received second frame image data and transmit the third frame image data to the pixel rearrangement processor, and
wherein the pixel rearrangement processor is configured to perform pixel rearrangement on multiple channels of the third frame image data and form an absolute frame output image.

12. The audio-video display device according to claim 7, wherein the transmitter comprises a V-By-One communication interface configured to transmit the absolute frame output image to an external display terminal.

13. A processing method using the signal processing device as claimed in claim 1, comprising:
using each of the plurality of channel receivers to parse an audio-video signal received, wherein the audio-video signal has a data format defined by an SDI protocol and wherein the data format comprises a time code that characterizes time information;
using at least one of the time code processors to extract the time code from a parsed audio-video signal obtained by a corresponding channel receiver through parsing and convert the time code into a frame time code that characterizes frame timing information, and form first frame image data comprising the frame time code and transmit it to the signal processor;
using the signal processor to form an absolute frame output image based on multiple channels of the first frame image data, frame time codes in multiple channels of the first frame image data, and an internal clock signal generated by the timing generator; and
using the transmitter to transmit the absolute frame output image for display.

14. The processing method according to claim 13, wherein said using the signal processor to form an absolute frame output image based on multiple channels of the first frame image data, frame time codes in multiple channels of the first frame image data, and an internal clock signal generated by the timing generator comprises:
using the signal processor to transmit multiple channels of the first frame image data received to an external storage corresponding to the signal processing device, respectively and to form an absolute frame output image according to multiple channels of second frame image data read from the external storage and the internal clock signal, wherein the multiple channels of second frame image data are image data belonging to a same absolute frame and are formed by synchronizing the multiple channels of the first frame image data using the frame time code in an absolute frame synchronization manner.

15. The processing method according to claim 13, wherein the time code comprises hour data, minute data, second data, and frame data, and wherein said using at least one of the time code processors to convert the time code into a frame time code that characterizes frame timing information further comprises:

using the at least one of the time code processors to form a frame time code that characterizes frame timing information according to the frame data of the time code.

16. The processing method according to claim 15, wherein the frame data comprises high-order frame data and low-order frame data, and wherein said using the at least one of the time code processors to form a frame time code that characterizes frame timing information according to the frame data of the time code further comprises:

using the at least one of the time code processors to form a frame time code that characterizes frame timing information according to the low-order frame data of the frame data.

17. The processing method according to claim 14, wherein the signal processor comprises a bus arbiter, a pixel rearrangement processor, a plurality of input storages in one-to-one correspondence with the plurality of time code processors, and a plurality of output storages in one-to-one correspondence with the plurality of time code processors, and wherein said using the signal processor to transmit multiple channels of the first frame image data received to an external storage corresponding to the signal processing device, respectively and to form an absolute frame output image according to the multiple channels of second frame image data read from the external storage and the internal clock signal further comprises:

using each of the plurality of input storages to transmit the first frame image data from a corresponding time code processor to the bus arbiter;

using the bus arbiter to communicate with the external storage corresponding to the signal processing device, transmit the multiple channels of the first frame image data to the external storage, and send the multiple channels of second frame image data read from the external storage to corresponding output storages;

using the output storages to form third frame image data according to the internal clock signal and the multiple channels of second frame image data, and to transmit the third frame image data to the pixel rearrangement processor; and using the pixel rearrangement processor to perform pixel rearrangement on multiple channels of the third frame image data and to form an absolute frame output image.

* * * * *